Figure 1:
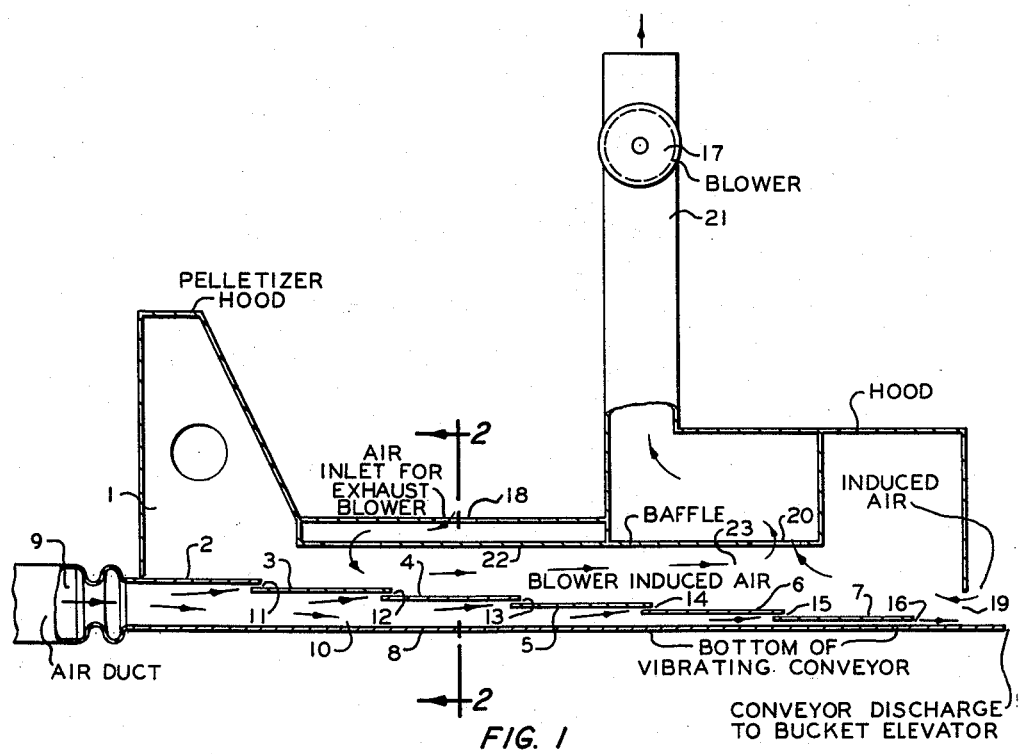
Figure 2:
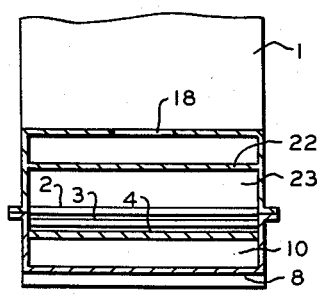
Figure 1A:
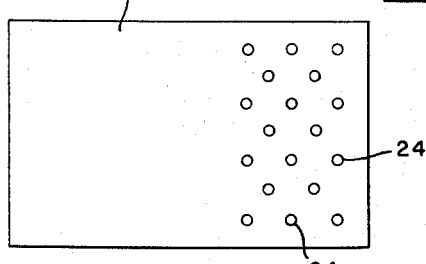

Nov. 26, 1963  C. L. DAVIS ET AL  3,112,186
COOLING SUBDIVIDED PRODUCT
Filed Nov. 30, 1959

INVENTORS
J.W. ALEXANDER
C.L. DAVIS
BY
Hudson & Young
ATTORNEYS 3,112,186
COOLING SUBDIVIDED PRODUCT
Charles L. Davis and James W. Alexander, Borger, Tex., assignors to Phillips Petroleum Company, a corporation of Delaware
Filed Nov. 30, 1959, Ser. No. 856,664
2 Claims. (Cl. 34—10)

This invention relates to cooling a subdivided product. In one of its aspects, it relates to a method of cooling or air blowing a moving mass of subdivided product. In another of its aspects, the invention relates to an apparatus for air blowing a moving mass of subdivided product. In another of its aspects, the invention relates to a method of blowing refrigerated air through a moving mass of subdivided product, especially a product which tends to coalesce or agglomerate, for example, rubbery extruded polymer product as obtained from an extrusion drier, by passing this material through a vibrating conveyer zone in which the material, as it passes through the zone, is maintained at succeeding lower levels in cascade fashion while cooling air, preferably refrigerated air, is passed through the product as it cascades from level to level tending to break up any matting or agglomeration which tends to occur and providing intimate contact between the particles of the material and the cooling or refrigerated air while also passing over the top of the mass of material as it passes through said zone additional air which preferably is sucked into the zone. In another of its aspects, the invention comprises apparatus essentially having, in combination, an elongated duct, a series of cascaded overlapping plates, the highest plate being at one end of the duct and the lowest plate being near the other end of the duct, the plates being arranged to form a drop from each level of the cascade sufficient to provide for passage of air at the overlapped portions from beneath the plates to above the plates, means for introducing air into the duct below said plates and through the space between the overlapped portions of said plates, means to induce air to flow into said duct above said plates, means to permit induced air to enter into said duct at each end portion thereof and means for removing air introduced into said duct from a point intermediate said end portions of said duct.

In the manufacture of various products, especially materials which tend to agglomerate or mat during handling, it is frequently necessary to cool the same or to air blow the same for some other reason. For example, in the manufacture of synthetic rubber, polymer is passed through an extrusion drier to remove water therefrom. During the extrusion operation, the rubber becomes heated and must be cooled. The rubber crumbs which are formed by the extrusion drier have been effectively cooled by us by passing the same through a cooling zone in cascade fashion in which air is blown across the top of the crumb at its travels through the cooler while at the same time refrigerated air is blown up through the rubber crumb as it drops from level to level or step to step of the cascade.

We have found that it is possible to use the passage of refrigerated air between the overlapping portions of the steps of the cascade to impart to the rubber particles a forward tumbling motion as they pass from step to step or from one louver to another of the cascade. This action has been found to be critical to keeping the particles of rubber from sticking.

The important advantages of this invention will be appreciated by those studying this disclosure. However, as an indication to them, the following is given. A conveyer about 30 feet long arranged as a vibrating conveyer was fed extruded rubber pellets at a rate of 2,500 pounds per hour. This rubber was passed by this conveyer into a bucket conveyer or elevator which lifted the particles about 25 feet to the point at which the rubber was baled. When increasing the rate of flow of rubber over the vibrating conveyer to 3,500 pounds per hour, the extruded rubber was so hot at the other end of the conveyer that it could not be transported in the bucket conveyer due to sticking, etc. It was found that, by passing cooled air upwardly through the vibrating conveyer when it was operating at 3,500 pounds per hour, the bucket conveyer could be used. Thus, the rubber particles were taken from a temperature of 250° F. down to a temperature of about 200° F. sufficiently rapidly to avoid not only the sticking so that the bucket conveyer could be used and so that the crumbs obtained would not be matted but also decomposition of the crumb which, as is known, decomposes at elevated temperatures if the rubber is left at said temperatures for any substantial length of time.

Accordingly, it is an object of this invention to provide a method for cooling or air blowing a mass of moving particles. It is another object of this invention to provide an apparatus for air blowing a mass of moving particles. It is a further object of this invention to provide method and means for conveying a mass of moving particles without matting or sticking when said particles are of such a character and/or at such a temperature that there is a tendency for them to agglomerate. It is a still further object of this invention to provide a method and means for rapidly cooling a mass of particles which is being conveyed to a place of packaging so that chemical agents, which may be therein and which may decompose upon remaining at an elevated temperature, may be preserved without substantial decomposition. A still further object of the invention is to provide method and means for cooling extruded synthetic rubber polymer crumb, which may contain an anti-oxidant, while preventing said crumb from matting or otherwise agglomerating.

Other aspects, objects and the several advantages of this invention will be apparent from a study of this disclosure, the drawing and the appended claims.

The invention herein set forth and described being one of a physical character, it will be understood that the description herein, to the extent that it is specific to the handling of synthetic rubber crumbs, is of a now particularly preferred use in the invention which, however, in its broadest aspects, is not limited to applications to synthetic rubber but which, in its more specific aspects, when used in connection with synthetic rubber, permits attaining of certain advantages in the rubber art due to the specific combination of steps and/or apparatus component parts which are unique.

According to the present invention, a particulate mass of particles, for example, a synthetic rubber crumb obtained from an extrusion drier, is passed through a vibrating conveyer zone in cascade manner; cooled air is blown in an upwardly and forwardly direction through the mass of particles as it passes downwardly from level to level while at the same time air is passed across the surface of the mass of particles.

Further, according to the invention, in its now preferred form, refrigerated air is blown into the bottom of a vibrating conveyor zone, the mass of particles to be treated is passed through the zone in cascade manner, removed from the bottom of said zone, refrigerated air is blown in an upwardly and forwardly direction through the mass of particles as it passes through said zone and as it passes from step to step in its cascade through said zone, additional air is blown across the surface of the mass of particles for a substantial distance of their travel through said zone in the direction in which said particles are moving and removed at a point above said particles from said zone at a point near the other end of said zone, additional air is introduced at the other end of said zone in a direction countercurrent to the direction of travel of the particles through said zone and removed from said zone after traveling a distance through said zone substantially shorter than the path of travel of the mass of particles through said zone.

Still according to the invention, there is provided a cascade cooler essentially comprising a vibrating conveyer comprising an elongated passageway, a series of overlapping plates arranged in cascade manner disposed within said passageway and attached to the walls of said passageway, means for blowing air in an upwardly and forwardly direction from beneath the cascade through the louvers thereof, means in said passageway above the cascade for introducing air to a high point of said cascade, means in said passageway for introducing air above said cascade at a low point thereof and means for removing air introduced into said passageway at a point intermediate said means for introducing air above said cascade at a high point thereof and said means for introducing air above said cascade at a low point thereof.

In the drawing, FIGURE I is a vertical section taken along the axis of an apparatus according to the invention, diagrammatically showing the internals of the apparatus. FIGURE IA is an enlarged view of plate 3 of FIGURE I showing perforations in the plate. FIGURE II is a cut taken along line 2—2 of FIGURE I.

Referring now to FIGURE I, pellets from a synthetic rubber extrusion drier are introduced from the drier into hood 1 and onto the first step 2 of a cascade arrangement of plates 2—7 disposed within vibrator conveyer conduit 8 into which cooled or refrigerated air is blown at 9 into space between the plates and the bottom of the conveyer designated by 10 and from space 10 through the apertures between successive plates at 11, 12, 13, 14 and 15 and through aperture 16, at the end of the cascade arrangement in an upwardly and forwardly direction while air is introduced by blower 17 to pass into the generally enclosed conveyer through opening 18 and through opening 19 across the surface of the cascade arrangement to exhaust port 20 to be exhausted by duct 21 and blower 17 from the system.

Referring now to FIGURE II of the drawing, there can be seen an end view of space 10 below trays 2 and 3, the remaining trays being omitted for sake of simplicity. Baffle member 22 of FIGURE I is also seen in FIGURE II to help visualize how the air passes closely over the top of the mass of material moving along the cascade as well as upwardly and in a forwardly direction from space 10.

While in the figures of the drawing baffle member 22 is shown to be a substantially plane member disposed in an essentially parallel position with respect to the bottom of conveyer 8, it is within the scope of the invention to so fashion partition 22 as to provide for accommodation of all of the air necessary to be moved and to this extent the partition can have any desired shape either gradually increasing or, if desired, decreasing at any portion along its length in cross section of the space generally indicated in FIGURE II at 23.

It has been possible, by selecting in actual operation a louver opening of approximately ½ inch between successive plates of the cascade, to blow air upwardly and in a forwardly direction at a rate such that violent agitation of the rubber crumbs being conveyed was obtained, obtaining and maintaining separation of the particles to obtain and maintain maximum surface area. Indeed, we have been successful in breaking up matting which had been experienced heretofore.

It will be noted that the conveyer of the invention gives a step-down effect with very little loss of elevation, that there is an introduction of refrigerated air underneath the conveyer coupled with an exhaust blower to remove air heated by contact with the crumbs or mass of particles, that the invention specifically lends itself to inexpensive conversion of an existing vibrating conveyer to a cascade type cooling conveyer and that the converted conveyer prevents matting of the particles, for example, of the synthetic rubber particles which have been passed through such an apparatus.

In a specific apparatus, 3 feet long metal trays were placed at ½ inch levels below each preceding tray beginning at the pelletizer hood section of an existing vibrating conveyer about 30 feet long and about 18 inches wide. These trays formed a false bottom or plenum chamber through which refrigerated air was blown as herein described. This air cooled the trays providing a cooled surface over which the crumbs were conveyed and as the crumbs fell from tray to tray the refrigerated air was blown in an upwardly and forwardly direction through the crumbs, breaking up matting and/or preventing matting thereof, providing intimate contact not only between the crumbs and the refrigerated air blown therethrough but also between the crumbs and the blower-induced air generally passing over the trays. Thus, the forward tumbling motion of the rubber imparted to the same by the upwardly and forwardly blowing air passing through the louvers caused the rubber to be blown up into the additional air induced at openings corresponding to 18 and 19 of FIGURE I of the drawing.

As a feature of the invention, the residence time can be extended and/or the operation materially benefitted by providing perforations in part or all of any of the plates 2—7 to provide for fluidization at least to an extent of the particles. These perforations are shown at 24 in FIGURE IA. In a now interesting embodiment, the perforations are placed merely at the discharge end of a plate to provide some fluidization or lift to provide for expansion of the stream of particles as these fall from plate to plate.

Reasonable variation and modification are possible within the scope of the foregoing disclosure, the drawing and the appended claims to the invention, the essence of which is that there have been provided method and means for cooling a particulate mass of material, for example, synthetic rubber crumbs, by passing the same in cascade fashion through a vibrating conveyor while blowing refrigerated air in an upwardly and forward direction through said mass as it is passed from step to step of the cascade while at the same time air is passed across the top of said mass substantially as set forth and described herein.

We claim:

1. A method for cooling and breaking up a mass of particulate rubber crumb which has a tendency to agglomerate which comprises passing said rubber crumb through a vibrating conveyor zone, breaking up said mass by dropping said rubber crumb successively from a high level to a lower level in step-wise fashion while simultaneously blowing refrigerated medium upwardly and forwardly through said rubber crumb as it passes through said zone from an inlet to an outlet of said zone and fluidizing said rubber crumb particulate with a fluidizing medium as said particulate rubber crumb passes through at least a portion of said vibrating conveyor zone.

2. A method for cooling and breaking up a mass of particulate rubber crumb which has a tendency to agglomerate which comprises passing said rubber crumb through a vibrating conveyor zone, breaking up said mass by dropping said rubber crumb successively from a high level to a lower level in step-wise fashion while simultaneously blowing refrigerated medium upwardly and forwardly through said rubber crumb as it passes through said zone from an inlet to an outlet of said zone and fluidizing said rubber crumb particulate at least as said particulate rubber crumb passes across that portion of said high level and said lower level, which portion is at the downstream end of each of said levels at which fluidization is effected.

References Cited in the file of this patent
UNITED STATES PATENTS

| | | |
|---|---|---|
| 2,094,786 | Flint | Oct. 5, 1937 |
| 2,312,034 | Gaffney | Feb. 23, 1943 |
| 2,346,500 | Moore | Apr. 11, 1944 |
| 2,431,799 | Gaffney | Dec. 2, 1947 |
| 2,904,323 | Cova et al. | Sept. 15, 1959 |